Sept. 25, 1956   E. H. TERLINDE   2,764,746
QUICK DETACHABLE COUPLING
Filed Aug. 8, 1952
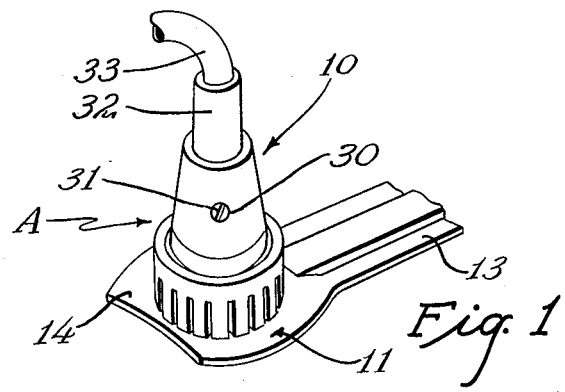
Fig. 1
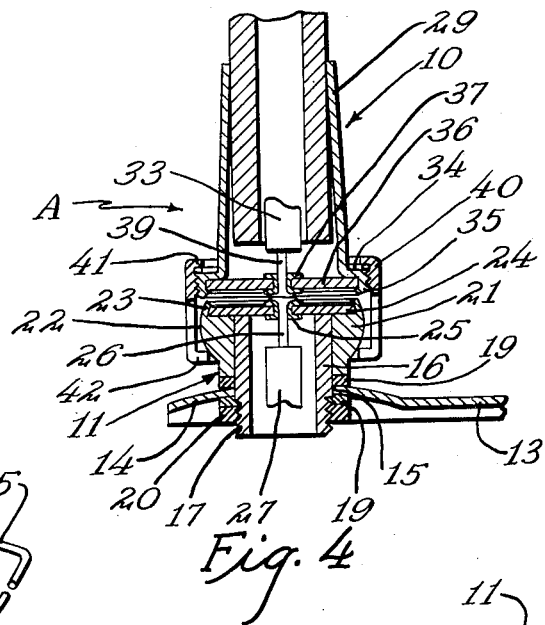
Fig. 4
Fig. 5
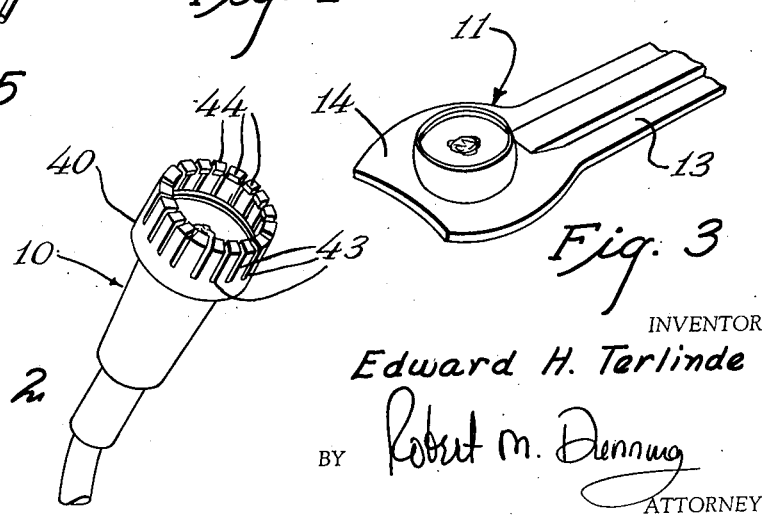
Fig. 2
Fig. 3
INVENTOR
Edward H. Terlinde
BY Robert M. Denning
ATTORNEY

United States Patent Office 2,764,746
Patented Sept. 25, 1956

2,764,746

QUICK DETACHABLE COUPLING

Edward H. Terlinde, St. Paul, Minn.

Application August 8, 1952, Serial No. 303,367

7 Claims. (Cl. 339—8)

This invention relates to an improvement in quick detachable coupling and deals particularly with an electrical conductor which can be quickly and easily disconnected.

Various types of detachable connectors have been provided for connecting a pair of conductors. Certain of these connectors telescope together and frictionally engage so that they can be separated. Others are equipped with a threaded fastener by means of which the two parts may be interengaged. The present invention comprises a spring fastening which may be pushed into engagement and pulled out of engagement and yet which permits angularity between the connected members.

In connecting an amplifier cord to an accordion microphone some difficulty has been experienced in providing a conductor which will normally remain attached, but yet which can be pulled apart in the event sufficient pull is exerted. Screw type connectors are normally used in such installations, a male threaded part being engageable into an internally threaded cooperable part. When such fasteners are fastened, the connected parts usually extend with the male part at right angles to the surface to which the female part is secured. If a strong pull is exerted upon the amplifier cord tending to bend the connector, either the threads are stripped or the surface of the relatively fragile instrument is cracked or broken. It is the purpose of this invention to eliminate such difficulty.

A feature of the present invention lies in the provision of a connector having a projecting portion provided with a curved or spherical surface. A cooperable connecting portion is provided with spring fingers which encircle the spherical surface and hold the two parts together. The spring fingers may spread apart if sufficient pressure is exerted, thereby permitting the two parts to become disconnected. If the connected part is pulled angularly with respect to the spherical surface, the spring jaws will more readily become detached and will permit the separation of the parts before breakage occurs. At all other times, the electrical circuit is closed between the connected parts;

A feature of the present invention lies in the provision of a connector having one part provided with a rounded outer surface and having another part provided with a projecting sleeve incorporating spring fingers. The sleeve is adjustably connected to the second part of the connector so that compensation for wear may be obtained. The tension under which the spring fingers engage the connector may also be adjusted.

A feature of the present invention resides in the fact that the two parts of the connector may move angularly to some extent without becoming detached. As a result the two parts of the connector may fit together in such a way as to set the internal contacts and to permit the contact points to firmly engage one another.

These and other objects and novel features of my invention will be more clearly and fully set forth in the following specification and claims.

In the drawings forming a part of my specification:

Figure 1 is a perspective view of my connector in assembled form.

Figure 2 is a perspective view of one part of the connector separated from the other part.

Figure 3 is a perspective view of the second part disconnected from the first part.

Figure 4 is a sectional view through the structure.

Figure 5 is a perspective view of a detailed portion of the apparatus.

The connector is indicated in general by the letter A. It comprises two separable parts, one of which is indicated in general by the numeral 10 and the other of which is indicated in general by the numeral 11.

The base portion of the device is shown attached to a mounting strip 13 which forms the base plate of the apparatus. This strip is used in the accordion mounting type of structure and includes a slightly convex anchoring end 14. Any type of base plate could be employed, the base plate including an aperture 15 through which the connector may extend.

The connector includes a tubular shank 16 having a threaded end 17 thereupon. Washers 19 may be provided on opposite sides of the base plate 14 and a clamping nut 20 may be employed to clamp the base plate against an enlargement 21 at the opposite end of the shank. The enlarged end of the shank as indicated at 21 is provided with a rounded outer surface 22 which may be a portion of a spherical surface or may comprise a rounded surface with a somewhat shorter radius. Thus, this end may be considered to comprise substantially a cylindrical segment. The enlargement 21 is either integral with the shank 16 or is integrally attached thereto.

The enlargement 21 is provided with an annular projecting lip 23 which forms a continuation of the rounded outer surface 22. A disc of insulation 24 is inserted within the lip or flange 23 and the marginal edge of this member is spun or rolled over to anchor the insulation disc in place. A grommet 25 extends through the center of the disc 24 and is designed to form an electrical contact with a conductor 26. The conductor 26 is extended through the grommet 25 and is anchored in place by solder or other similar material to provide a rounded outer surface. The conductor 26 is insulated as indicated at 27 to hold the conductor in electrically spaced relation to the shank 16.

The part 10 of the connector includes a tapered sleeve 29 which is provided with a radially extending threaded opening 30 to accommodate a set screw 31. The set screw 31 is designed to adjustably support a sleeve 32 designed to accommodate an insulated conductor 33. The large diameter end of the tapered sleeve 29 is provided with an outwardly extending flange 34 which terminates in a substantially cylindrical externally threaded flange 35. The cylindrical flange 35 encircles an insulation disc 36 having an axial grommet 37 extending therethrough. The disc 36 is held in place by spinning or riveting over the end of the flange 35. The grommet 37 is designed to accommodate the wire 39 on the interior of the insulated conductor 33. The wire 39 extends through the grommet 37 and is soldered or otherwise fastened in place to provide a projecting contact element.

A sleeve 40 is provided with an inturned flange 41 at one extremity and an inturned flange 42 at its opposite end. The sleeve is internally threaded near the flange 41 for accommodation of the external threads of the flange 35. The flange 42, together with the greater portion of the sleeve 40, is radially slotted as indicated at 43 the radial slots 43 separating the sleeve into a series of angularly spaced spring fingers 44. The internal diameter of the sleeve 40 is approximately the same as the largest diameter of the rounded surface 22 of the connector portion 11, while the internal diameter of the flange 42 is of slightly smaller diameter than the largest diameter of the rounded surface 22. The fingers are of proper length and are sufficiently resilient to engage over the rounded surface 22 and to hold the two parts of the connector ordinarily engaged.

In order to hold the sleeve 40 and the flange 35 from relative movement, a spring 45 is interposed between the flange 41 and the surface of the flange 34. This spring 45 is generally rectangular in shape and engages under tension between the flange 34 and the flange 41, thereby normally holding these parts from relative rotation. By reason of the rectangularity of the spring 45, the corners thereof assure the retention of the spring within the confines of the sleeve 40, as the inherent resiliency of the spring urges the four corners into engagement with the inner cylindrical surface of the sleeve. Also, the straight portions of the spring extend in chord-like fashion across surface portions of the flange 34, so that good frictional contact is provided between the flanges 34 and 41. The two parts may be rotated when necessary to provide an adjustment.

The operation of the connector is believed quite readily apparent from the foregoing description. The two parts of the connector are connected and disconnected by forcing the spring fingers of the part 10 over the rounded surface 22 of the part 11. The spring fingers hold the two parts closely together so that the contacts at the center of the disc 24 and 36 are in electrical contact. The two parts may be separated by merely pulling the parts away from one another, although the contact is more readily separated by a twisting action of the part 10 relative to the part 11. It will be seen that the two parts can pivot slightly with relation to one another without separating the central contacts.

In the event the spring fingers wear and the center contacts do not engage one another when the contact is closed, the tapered sleeve 29 may be threaded to a greater extent into the sleeve 40 so as to form a closer contact at the center. Thus the connector will function for a considerable period of time, any wear being taken up by the adjustment.

It will be noted that if excessive pull or twisting motion is exerted upon the connector portion 10, this action will twist the end of the conductor away from the base portion and will separate the parts before they are broken. Thus while the contact through the connector is broken by separation of the connector parts, the separation does not injure the parts nor the instrument to which the base part may be attached.

In accordance with the patent statutes, I have described the principles of construction and operation of my quick detachable coupling and while I have endeavored to set forth the best embodiment thereof, I desire to have it understood that this is only illustrative thereof and that obvious changes may be made within the scope of the following claims without departing from the spirit of my invention.

I claim:

1. A detachable connector comprising a pair of detachable members, one of said members including a sleeve having an inwardly directed flange at one end thereof, angularly spaced slots in said flange and sleeve dividing the same into angularly spaced resilient fingers having inwardly directed extremities, and the other of said members having a substantially spherical segment forming its outer surface, having a diameter greater than the inner diameter of said flange, a shank of smaller diameter than the diameter of said finger ends projecting from said other member in a direction normal to the end of the spherical segment, and an insulated contact supported at the end of each of said members, said contacts being engageable in contacting relation when said fingers are in engagement with said spherical segment surface.

2. A detachable connector including a pair of separable portions, one of said portions having a substantially spherical segment forming its peripheral surface, and the other portion including a sleeve designed to partially encircle said spherical surface, said sleeve having an inwardly directed flange at one end thereof, angularly spaced slits in said flange and sleeve dividing the same into a series of angularly spaced resilient fingers terminating in inwardly directed extremities, the diameter of said spherical surface being greater than the inner diameter of said flange, a shank of smaller diameter than the diameter of said finger ends projecting from said other member in a direction normal to the end of the spherical segment, and contacts supported within said members and in contact relation when said sleeve encircles said surface.

3. The construction described in claim 2 and including an externally threaded tubular body for the accommodation of a section of a conductor member having electrical connection with one of said contacts and internal threads on said sleeve with which said external threads may adjustably engage.

4. The construction described in claim 2 and including an insulation disc encircled by each of said separable members for supporting said contacts.

5. A separable connector for use in combination with a member having a substantially spherical segment forming its outer surface, the connector including a sleeve having an inwardly directed flange at one end thereof, said flange and said sleeve having a series of longitudinally extending slits therein dividing a portion of said sleeve and said flange into a series of fingers, said sleeve being formed of resilient material, internal threads on the unslitted end of said sleeve, a tubular connector body having external threads at one end thereof engageable in the internal threads of said sleeve, an insulation disc within said threaded end of said body, and contact means supported by said disc in spaced relation to the edges of the disc.

6. A separable connecting member for use in combination with a connector portion having a substantially spherical segment forming its peripheral surface, the connecting member including a sleeve, a first inturned flange at one end of said sleeve, angularly spaced slits in said flange and extending longitudinally of said sleeve to a point spaced from the opposite end of the sleeve, said slits forming a series of angularly spaced fingers, said sleeve being formed of resilient material, internal threads on said sleeve at the unslitted end thereof, a second inturned flange at the unslitted end of said sleeve, a connector body portion having a generally cylindrical externally threaded flange threadably engaged with the internal threads on said sleeve, a flange extending inwardly from said externally threaded flange, and a tubular portion of smaller diameter than said externally threaded flange extending axially from said inwardly extending flange, an insulation disc within said externally threaded flange, and a conductor portion in said insulation disc at a point spaced from the marginal edges thereof and spaced inwardly from the inwardly extending flange.

7. The construction described in claim 6 and including resilient means interposed between said second inturned flange and said inwardly extending flange for providing frictional engagement therebetween.

References Cited in the file of this patent

UNITED STATES PATENTS

| | | |
|---|---|---|
| 2,466,499 | Sokolik | Apr. 5, 1949 |
| 2,468,846 | Trainor | May 3, 1949 |
| 2,548,457 | Wilson | Apr. 10, 1951 |

FOREIGN PATENTS

| | | |
|---|---|---|
| 545,514 | France | July 25, 1922 |